United States Patent

Wauer et al.

[11] Patent Number: 5,721,419
[45] Date of Patent: Feb. 24, 1998

[54] OUTPUT POWER REGULATING DEVICE FOR A RADIANT HEATING ARRANGEMENT

[75] Inventors: Roman-Hartmut Wauer, Kisslegg; Josef Hecht, Erlenmoos, both of Germany

[73] Assignee: AKO-Werke GmbH & Co. KG, Wangen, Germany

[21] Appl. No.: 746,009

[22] Filed: Nov. 5, 1996

[30] Foreign Application Priority Data

Nov. 30, 1995 [DE] Germany ............... 195 44 652.6

[51] Int. Cl.$^6$ .................................... H05B 1/02
[52] U.S. Cl. .................. 219/497; 219/492; 219/506; 340/589; 374/102
[58] Field of Search ............... 219/492, 497, 219/499, 501, 481, 506, 508; 340/589; 374/102; 99/330–333, 325

[56] References Cited

U.S. PATENT DOCUMENTS

| | | | |
|---|---|---|---|
| 4,506,995 | 3/1985 | Polster | 99/342 |
| 4,524,264 | 6/1985 | Takeuchi et al. | 219/497 |
| 4,551,007 | 11/1985 | Elter | 355/141 FV |
| 4,796,207 | 1/1989 | Andre et al. | 364/557 |
| 4,868,368 | 9/1989 | Araki | 219/216 |

*Primary Examiner*—Mark H. Paschall
*Attorney, Agent, or Firm*—Scully, Scott, Murphy & Presser

[57] ABSTRACT

An output power regulating device for a radiant heating arrangement (2) having a temperature sensor (3) for detecting the temperature of the cooking surface (1), and a preselector (4), is to be so designed that it only supplies the required amount of energy to the radiant heating arrangement (2) in dependence on the thermal loading. For that purpose a microcontroller (10) cyclically detects the variation in respect of time of the actual temperature and the deviation thereof from the reference value. A memory (12) contains a value matrix for the possible pairs in respect of the variation and the deviation in the actual temperature. The microcontroller (10) takes the appropriate regulating value from the value matrix and with that value controls the radiant heating arrangement (2).

6 Claims, 2 Drawing Sheets

OUTPUT POWER REGULATING DEVICE FOR A RADIANT HEATING ARRANGEMENT

BACKGROUND OF THE INVENTION

1. Field of the Invention

The invention relates to an output power regulating device for a radiant heating arrangement comprising a temperature sensor for detecting the temperature of a cooking surface, and a preselector.

2. Discussion of the Prior Art

A radiant heating arrangement for a hot plate is described in DE 33 15 438 A1. Associated with a cooking surface or hob are three different heating coils which are controllable for setting different levels of output power, by means of a seven-stage switch. There is no provision for temperature regulation. A temperature sensor only serves for switching a temperature limiter.

DE 33 15 438 A1 also refers to a hot plate heating arrangement which operates with an output power control device. This operates the heating body with different adjustable pulse-space ratios.

A temperature regulator for electric hot plates is known from DE 28 50 359 B2. That involves a two-position regulator which switches off the heating arrangement shortly before a set reference temperature is reached.

Prior German patent application No. 195 22 748 describes a regulating device for a hot plate radiant heating arrangement. In order at the same time to provide the function of an energy regulator, with a bar-type expansion sensor which serves for safety switch-off purposes, the expansion sensor is disposed in the area of influence of an additional heating body. The output power of the additional heating body can be set by a control circuit, by means of a temperature selector.

DE 41 11 784 A1 discloses an electronic regulator for electrical heating appliances, which is provided with a microcontroller containing process data for the individual regulating functions, in fixedly programmed form.

SUMMARY OF THE INVENTION

The object of the present invention is to propose an output power regulating device of the kind set forth in the opening part of this specification, which, in dependence on the thermal loading—due to cooking pots or pans and in the idle condition—supplies the radiant heating arrangement with precisely the amount of energy which is necessary to maintain a temperature level as selected by the user.

In accordance with the invention, in an output power regulating device of the kind set forth in the opening part of this specification, the foregoing object is attained through the provision of a microcontroller which, on the one hand, detects a variation (dT) in respect of time of the actual temperature (Ti) of the cooking surface cyclically as a first input value, whereas, on the other hand, the respective actual temperature (Ti) from the reference value of the preselector cyclically as a second input value, and that associated with the microcontroller in a memory is a value matrix which contains regulating values for the possible pairings of the first and second input values (dT,dR), and that with the respectively occurring pair of input values (dT, dR), the microcontroller takes over the appropriate regulating value from the value matrix and with that regulating value controls the output power of the radiant heating arrangement.

By virtue thereof, in operation the variation in temperature in respect of time (temperature rise or temperature fall) of the cooking surface and the deviation in temperature of the actual temperature from the set value of the preselector are continuously ascertained. The procedure involves reading out of the value matrix, in combination of the respective variation in temperature and the deviation in temperature, a regulating value stored therein, which is most suitable for counteracting the variation in temperature or the deviation in temperature. In that respect, the respective loading of the radiant heating arrangement which is manifested in a corresponding variation in temperature is ascertained by itself. If for example a cold cooking pan is put onto the hot cooking surface, there is then a drop in temperature which results in the selection of a high regulating value whereby the radiant heating arrangement is set to a high level of output power, more specifically independently of the respective setting of the preselector. If for example the cooking surface is operated in the idle condition, that is to say without a cooking pan thereon, there is then only a slight drop in temperature in relation to time so that a correspondingly low regulating value is selected, more specifically also independently of the respective setting of the preselector.

Overall therefore only that amount of energy which is also dissipated from the cooking surface-cooking pan system is supplied.

The setting of the preselector is also evaluated in the same manner. If for example it is turned up (reference temperature higher than actual temperature), a correspondingly higher regulating value is then read out, while if it is turned down (reference value lower than actual temperature), a correspondingly lower regulating value is read out, the selection of the regulating values in relation to the value matrix also depending on the instantaneous temperature configuration.

The maximum possible output power of a radiant heating arrangement may be higher than its nominal value. If the nominal power is for example 1200 W, then in accordance with the state of the art that is the highest value which the user can set. If the maximum possible output power is higher in an individual situation, for example 1500 W at 230 V, then that excess of power (330 W) remains unused in accordance with the state of the art. The described regulating device utilises that excess of power for rapidly bringing the radiant heating arrangement up to an incandescent state or for rapidly starting cooking.

Cyclic detection of the variation in temperature or the deviation in temperature is effected at intervals which are very short in comparison with the duration of a cooking operation, preferably within a period of a mains ac voltage, so that for example values which are updated every 10 ms are available for the variation in temperature or the deviation in temperature.

In a simple configuration according to the invention it suffices if the matrix contains regulating values for positive and negative and no variation in the actual temperature and for positive and negative and no deviation in respect of the actual temperature from the reference value. In a preferred embodiment of the invention the matrix contains two or more regulating values for positive ("large" and "small") and negative ("large" and "small" variations in respect of time of the actual temperature and/or the deviation in respect of the actual temperature from the reference value.

As described the power regulation system automatically adapts itself to the instantaneous current temperature configuration of the cooking area. The user only makes a preselection. Therefore the situation can arise where the setting of the preselector which is effected by the user and which is usually effected on the basis of numbers "1" to "3"

or "1" to "15" is higher than the power which is actually switched on in the individual situation in question. In a configuration of the invention that can be optically or acoustically indicated to the user so that he can correspondingly turn down the preselector.

On the basis of automatic power adaptation, in a development of the invention the preselector can be so designed that it can be set in accordance with verbal concepts such as "heat", "cook", "braise", "fry" or "roast". That makes it easier for the user to set the preselector because he thus has a simple mental link with the desired operation.

In accordance with the state of the art, radiant heating arrangements have a residual heat display which warns the user against touching a cooking surface which is still hot, after it has been switched off. In an embodiment of the invention that warning display can already light up when the preselector is switched on and an actual temperature above the temperature such as to cause a burn is reached. For that purpose the display is actuated by way of a suitable matrix value.

BRIEF DESCRIPTION OF THE DRAWINGS

Further advantageous configurations of the invention are set forth in the appendant claims and are described in the following description of a specific embodiment. In the drawing:

DETAILED DESCRIPTION OF THE PREFERRED EMBODIMENTS

Figure 1:
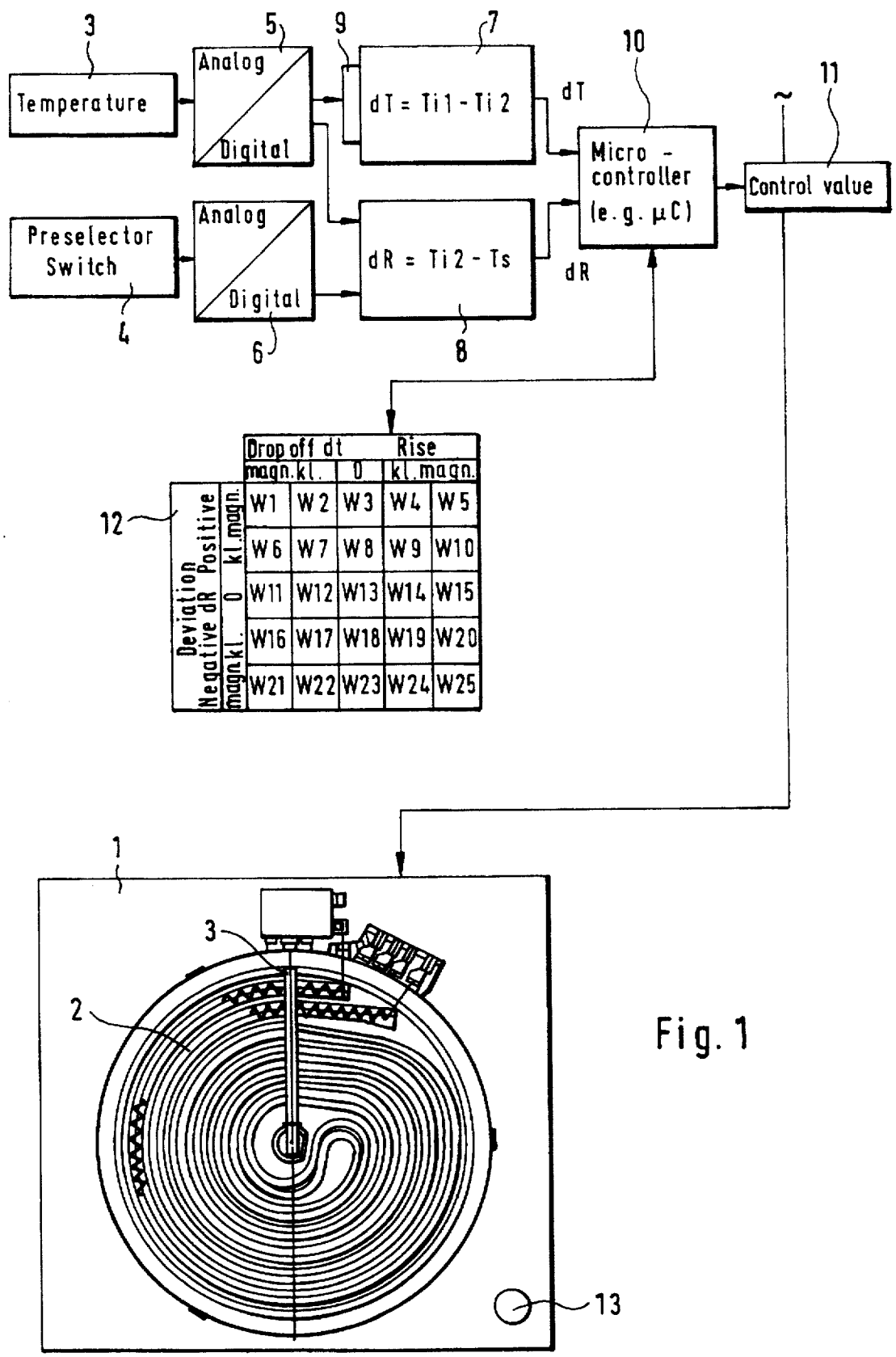
FIG. 1 shows a block circuit diagram of an output power regulating device of a radiant heating arrangement.

An electric cooker has a glass ceramic plate with a plurality of cooking surfaces or areas of which one is shown at reference numeral 1 in FIG. 1. Associated with each cooking surface 1 is a radiant heating arrangement 2 formed for example by a spirally laid, coiled heating resistance wire. Arranged between the cooking surface 1 of the glass ceramic plate and the radiant heating arrangement 2 is a temperature sensor 3 which also detects the temperature of the cooking surface 1. The temperature sensor 3 is an expansion sensor or an electric temperature sensor, for example a thermo-couple element or a semi-conductor sensor, for example a platinum element. Provided on the cooker is a preselector 4 which can be set in stages by the user in accordance with numerical values or in accordance with concepts relating to the cooking operation such as "heat", "cook", "braise", "fry" or "roast", the setting ultimately corresponding to a temperature reference value (Ts).

Analog-digital converters 5 and 6 respectively are connected downstream of the temperature sensor 3 for detecting the respective actual temperature Ti, and the preselector 4. By way of the analog-digital converter 5, the respective actual temperature Ti is applied to a difference value-forming device 7 and a difference value-forming device 8. The temperature Ti1 which obtains in each case just before detection of the current actual temperature Ti2 is also applied to the difference value-forming device 7 by way of an intermediate storage device. The difference value-forming device 7 ascertains the value dT=Ti1–Ti2, corresponding to the respective variation in temperature. That value is fed as an input value to a regulating value-forming device, in particular a microcontroller 10. The difference value dT is formed in each case within a fixed period of time, preferably within a period of the mains ac voltage, for example within a half-wave of 10 ms, so that after each period of the mains ac voltage, there is available an updated value for dT. Having regard to the inertia of the radiant heating arrangement however it is also possible to provide for longer times for forming the current value in respect of the variation in relation to time in the actual temperature Ti. At any event cyclic ascertainment of the variation in temperature dT is shorter than variations in the actual temperature, which have an effect in the cooking procedure.

The difference value-forming device 8 forms the difference between the current temperature actual value Ti2 and the temperature reference value Ts. It forms the input value dR=Ti2–Ts for the microcontroller 10. That input value can be updated in the same times as the value dT.

The microcontroller 10 can control a control circuit 11 which, for example by way of a triac, sets the output power which is fed to the radiant heating arrangement from the electric mains.

Associated with the microcontroller 10 is a non-volatile memory 12 which contains regulating values W1 to W25 for the control circuit 11, in the form of a matrix. The regulating values W1 to W25 are inputted at the manufacturing end in accordance with the respective type of the radiant heating arrangement 2. A respective one of the regulating values W1 to W25 is called up from the memory 12 by the microcontroller 10 in accordance with the respective current pairing of the input values dT and dR. For the input value dT the matrix has columns for a large temperature drop, a small temperature drop, no temperature drop, a small temperature rise and a large temperature rise. For the input value dR the matrix has lines for a large positive temperature deviation, a small temperature deviation, no temperature deviation, a small negative temperature deviation and a large negative temperature deviation.

Figure 2:
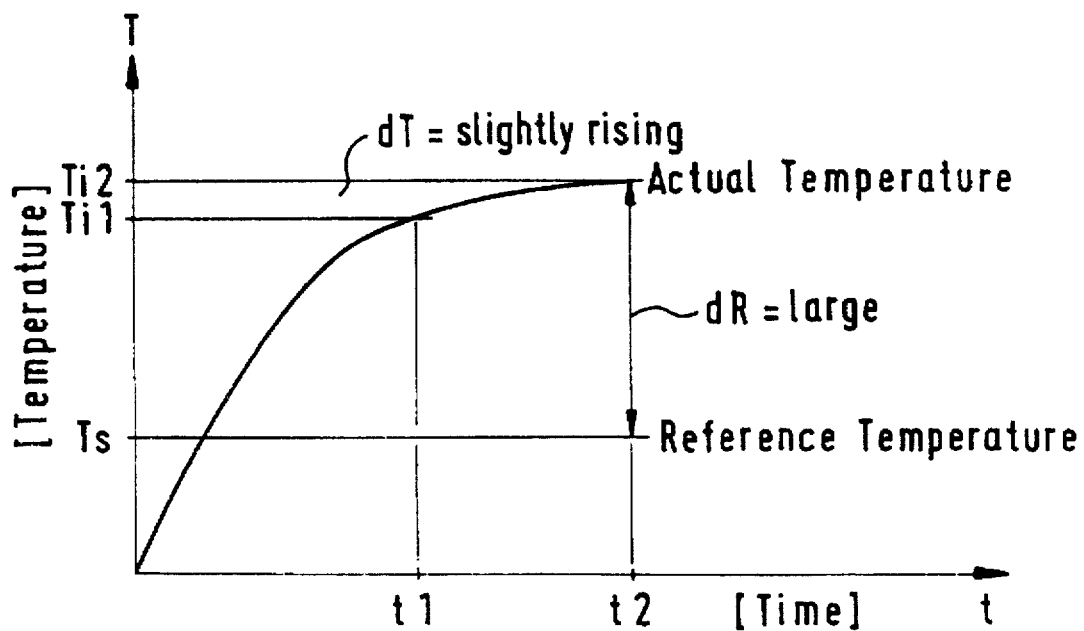
FIG. 2 shows a temperature-time graph.

In accordance with the current variation in temperature dT, that is to say the current temperature gradient, and the respective deviation in respect of the actual temperature Ti from the reference temperature Ts which is determined by way of the preselector 4, the corresponding regulating value is always applied to the control circuit 11 within each mains alternation period. FIG. 2 shows an example in that respect.

Referring to FIG. 2, the temperature rise in respect of the actual temperature Ti2 at the time t2 is small relative to the temperature Ti1 at the time t1; dT is therefore small. The negative deviation in respect of the reference temperature Ts is large relative to the actual temperature at the time t1 or t2 respectively. Accordingly the regulating value W24 is called up. The regulating value W24 results in the radiant heating arrangement 2 being switched off.

When dR=0 and dT=0 occur simultaneously the regulating value W13 is called up. That also results in the radiant heating arrangement 2 being switched off. It is also switched off when the regulating values W14, W15, W18, W19, W20, W23 and W25 are called up. Those values can differ from zero if a particular cooling-down characteristic is desired.

Figure 3:
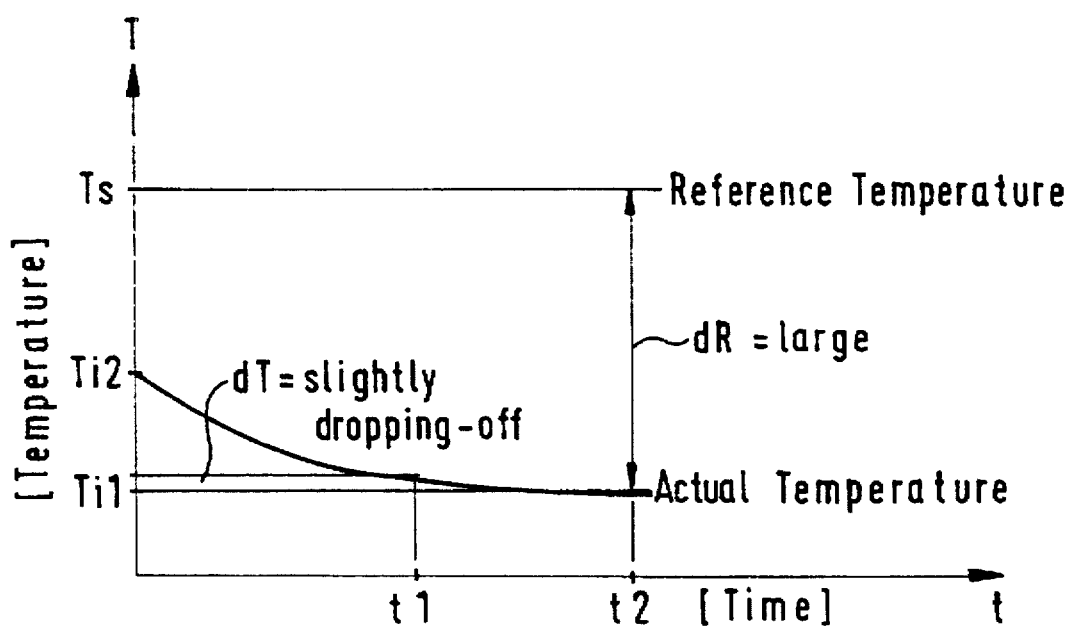
FIG. 3 shows another temperature-time graph.

FIG. 3 shows a temperature drop. Between the times t1 and t2 the temperature drop in respect of the actual temperature Ti is small; dT is therefore slightly falling. The positive deviation in respect of the reference temperature Ts is large relative to the actual temperature Ti at the time t1 or t2 respectively. Accordingly the regulating value W2 is called up. The regulating value W2 results in the radiant heating arrangement 2 being switched on.

The largest regulating value W1 for the radiant heating arrangement 2 is called up when the preselector 4 is turned up (large positive deviation) and there is a large temperature drop. A corresponding consideration applies for the further regulating values. The power-related graduation of the regulating values is adapted at manufacture to the respective radiant heating arrangement. In that respect their quality in terms of insulation, radiation characteristics and power density of the heating arrangement can be taken into consideration. In the lines W1 to W5, W6 to W10, W11 to W12, W16 to W17 and W21 to W22, a respective regulating value which is higher in relation to power is called up. This however does not mean that the regulating value W6 calls up a higher level of power than the regulating value W5. A corresponding consideration applies in respect of the regulating values W10 and W11 or W12 and W16 or W17 and W21. In columns W1 to W21 or W2 to W22 and W3 to W8 and W4 to W9 and W5 to W10 respectively a lower output power value is continuously called up because that direction denotes setting the preselector 4 back relative to the actual temperature.

The value table shows five columns and lines, to simplify the illustration in the drawing. Any greater number of columns and lines may be provided in order to enhance the level of fineness of resolution. On the basis of the fuzzy technique, the illustrated value table results in an association function in which the individual columns and lines are replaced by variables. It is then also possible to provide for evaluation to the effect of whether a value lies between two columns or lines or according to the respective weighting involved belongs to columns or lines.

The functions of the difference value-forming devices 7 and 8, the intermediate storage device 9, and the microcontroller 10 can be integrated in a microprocessor which possibly also performs the function of the converters 5, 6.

An optical display 13 is provided on the cooking surface 1. The display 13 is actuated by the microcontroller 10 when the preselector 4 is switched on and it remains switched on—even when the preselector is switched off—as long as there obtains an actual temperature Ti which is higher than a burn temperature at which the user can suffer burns upon touching the cooking surface 1.

The described output power regulating device can also replace an additional safety temperature limiter insofar as it always switches off when a higher limit temperature is reached. For that purpose the absolute value in respect of the actual temperature Ti is evaluated. If it is above a predetermined temperature threshold (safety temperature), then independently of the regulating value W1 . . . W25 the value zero is outputted as the regulating value and thus the radiant heating arrangement is switched off.

We claim:

1. An output power regulating device for a radiant heating arrangement comprising a temperature sensor for detecting the temperature of a cooking surface preselector switch for the manual determination of a reference temperature for the cooking surface, characterised in that a microcontroller (10) which is operatively connected and responsive to the setting of the preselector switch detects a variation (dT) over time of the actual temperature (Ti) of the cooking surface (1) cyclically as a first input value, the microcontroller (10) further detects a deviation (dR) in respect of the respective actual temperature ()Ti) from the reference temperature of the preselector switch (4) cyclically as a second input value and operatively connected with the microcontroller (10) is a memory (12) having a value matrix which contains regulating values (W1 to W25) for pairs of the first and second values (dT, dR), and that with a presently occurring pair of input values (dT, dR), the microcontroller (10) assumes a regulating value from the value matrix in said memory and with said regulating value controls the output power of the radiant heating arrangement (2), cyclic detection of the temperatures (Ti1, Ti2, Ts) being effected within a single period of the ac power supply voltage, and the preselector switch (4) being settable in accordance with heat levels such as "heat", "cook", "braise", "fry" or "roast".

2. An output power regulating device according to claim 1 characterised in that the matrix of the memory (12) contains regulating values (W1 to W25) for positive and negative and no variations in the actual temperature (Ti), and for positive and negative and no deviation in the actual temperature (Ti) from the reference value (Ts).

3. An output power regulating device according to claim 2 characterised in that the matrix contains at least two regulating values for positive "large" and "small" and negative "large" and "small" variations over time (dT) in the actual temperature (Ti), and the deviation (dR) in the actual temperature from the reference value.

4. An output power regulating device according to claim 1 characterised in that there is provided a display which displays to the user when the microcontroller (10) calls up a regulating value which is lower than the reference value set at the preselector switch (4).

5. An output power regulating device according to claim 1 characterised in that a warning display is produced by way of a matrix value when the preselector (4) is switched on and there is an actual temperature which is above a maximum permissible heating temperature.

6. An output power regulating device according to claim 1 characterised in that it performs the function of a safety temperature limiter.

* * * * *